(12) United States Patent
Gubbala et al.

(10) Patent No.: US 10,348,665 B2
(45) Date of Patent: Jul. 9, 2019

(54) EMAIL-INITIATED REPORT SERVICE

(71) Applicant: SAP SE, Walldorf (DE)

(72) Inventors: Suryasri Gubbala, Bangalore (IN);
Smita Naveen, Bangalore (IN);
Venkata Ramana Kumar Gubbala, Bangalore (IN)

(73) Assignee: SAP SE, Walldorf (DE)

(*) Notice: Subject to any disclaimer, the term of this patent is extended or adjusted under 35 U.S.C. 154(b) by 608 days.

(21) Appl. No.: 14/859,091

(22) Filed: Sep. 18, 2015

(65) Prior Publication Data
US 2017/0041270 A1 Feb. 9, 2017

(30) Foreign Application Priority Data

Aug. 6, 2015 (IN) .......................... 4108/CHE/2015

(51) Int. Cl.
*H04L 12/58* (2006.01)
(52) U.S. Cl.
CPC .............. *H04L 51/18* (2013.01); *H04L 51/02* (2013.01)
(58) Field of Classification Search
CPC ........ G06Q 10/107; H04L 51/18; H04L 51/02
See application file for complete search history.

(56) References Cited

U.S. PATENT DOCUMENTS

| | | | | |
|---|---|---|---|---|
| 7,587,678 B1 * | 9/2009 | English | ................ | G06Q 10/107 709/206 |
| 8,171,451 B2 * | 5/2012 | Boland | ............... | G06F 17/3089 709/206 |
| 8,676,902 B2 * | 3/2014 | Bahrs | ...................... | H04L 51/00 705/14.73 |
| 2002/0174185 A1 * | 11/2002 | Rawat | .................. | G06Q 10/107 709/206 |
| 2006/0271509 A1 * | 11/2006 | Wu | ....................... | G06F 17/241 |
| 2007/0174398 A1 * | 7/2007 | Addante | ................. | H04L 51/08 709/206 |
| 2008/0263162 A1 * | 10/2008 | Staiman | ................. | G06Q 10/06 709/206 |
| 2008/0294729 A1 * | 11/2008 | Ionescu | ................. | H04L 51/063 709/206 |
| 2009/0106371 A1 * | 4/2009 | Schmidt-Karaca | .......................... | G06Q 10/107 709/206 |
| 2014/0143350 A1 * | 5/2014 | Ortmann | .............. | G06Q 10/107 709/206 |

OTHER PUBLICATIONS

"SAP BusinessObjects Web Intelligence," cuveserv.com, visited Apr. 29, 2015, 3 pages.
Ross, "Determining Query and Analysis End-User Requirements with BusinessObjects XI Release 2," White Paper, Business Objects, 2007, 16 pages.

* cited by examiner

*Primary Examiner* — Joe Chacko
(74) *Attorney, Agent, or Firm* — Klarquist Sparkman, LLP

(57) ABSTRACT

An email sent from a user device can be received at a common email address of an enterprise resource planning server system. The email can be parsed to extract parameters to generate custom reports that are sent back the sender of the received email. The parameters can determine the type of report, the format of the report, and what data to include in the report. Authentication can restrict sending of reports to authorized users of the system.

20 Claims, 14 Drawing Sheets

US 10,348,665 B2

EMAIL-INITIATED REPORT SERVICE

BACKGROUND

Decisions based on corporate analytics sometimes need to be made based on reports when there is no access to system administrators maintaining those reports. The ability of decision makers to generate custom reports is limited because of their lack of familiarity with key systems generating the reports. Therefore, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as a method of generating a custom report implemented at least in part by a computing system comprising a computing device, the method comprising by the computing system: receiving an email message, wherein the email message is addressed to a common email address; determining, based on a sender address of the email message, an identity of a sender of the received email message; extracting one or more report request parameters from the email message; transforming the one or more report request parameters into a report generator service request comprising one or more report generator service request parameters; sending the report generator service request comprising the one or more report generator service request parameters to a report generator service; responsive to the report generator service request, receiving the custom report from the report generator service; and sending the custom report to the sender of the received email message by email.

An embodiment can be implemented as a system configured to generate a report from an email, the system comprising: one or more processor units; computer-readable memory; an email mailbox configured to receive and store email messages; an automated mailbox monitor configured to monitor the email mailbox for a received email message; an authenticator configured to determine an identity of a sender of the received email message; a parser configured to extract one or more report request parameters from the received email message; and a report orchestrator configured to request a report based on the extracted one or more report request parameters.

An embodiment can be implemented as one or more computer-readable storage media storing computer-executable instructions for causing a computing system to perform a method for generating a report, the method comprising: receiving an email message at an email address, wherein the email address is monitored by an automated mailbox monitor that triggers generation of the report; determining an identity of a sender of the received email message based on a sender address of the received email message; authenticating the identity of the sender, wherein the authenticating comprises comparing the sender address of the received email message to a list of authorized users; based on the identity of the sender, retrieving a group identifier and a position identifier identification; extracting report request parameters from the received email message, wherein the extracting extracts report request parameters comprising a report name, a report format, and a prompt value; constructing a report generator service request comprising the report name, the report format, the prompt value, the group identifier, and the position identifier; sending the report generator service request to a report generator service; receiving the report from the report generator service; and sending the report to the sender address of the received email message.

As described herein, a variety of other features and advantages can be incorporated into the technologies as desired.

DETAILED DESCRIPTION

Example 1

Example Overview

Figure 1:
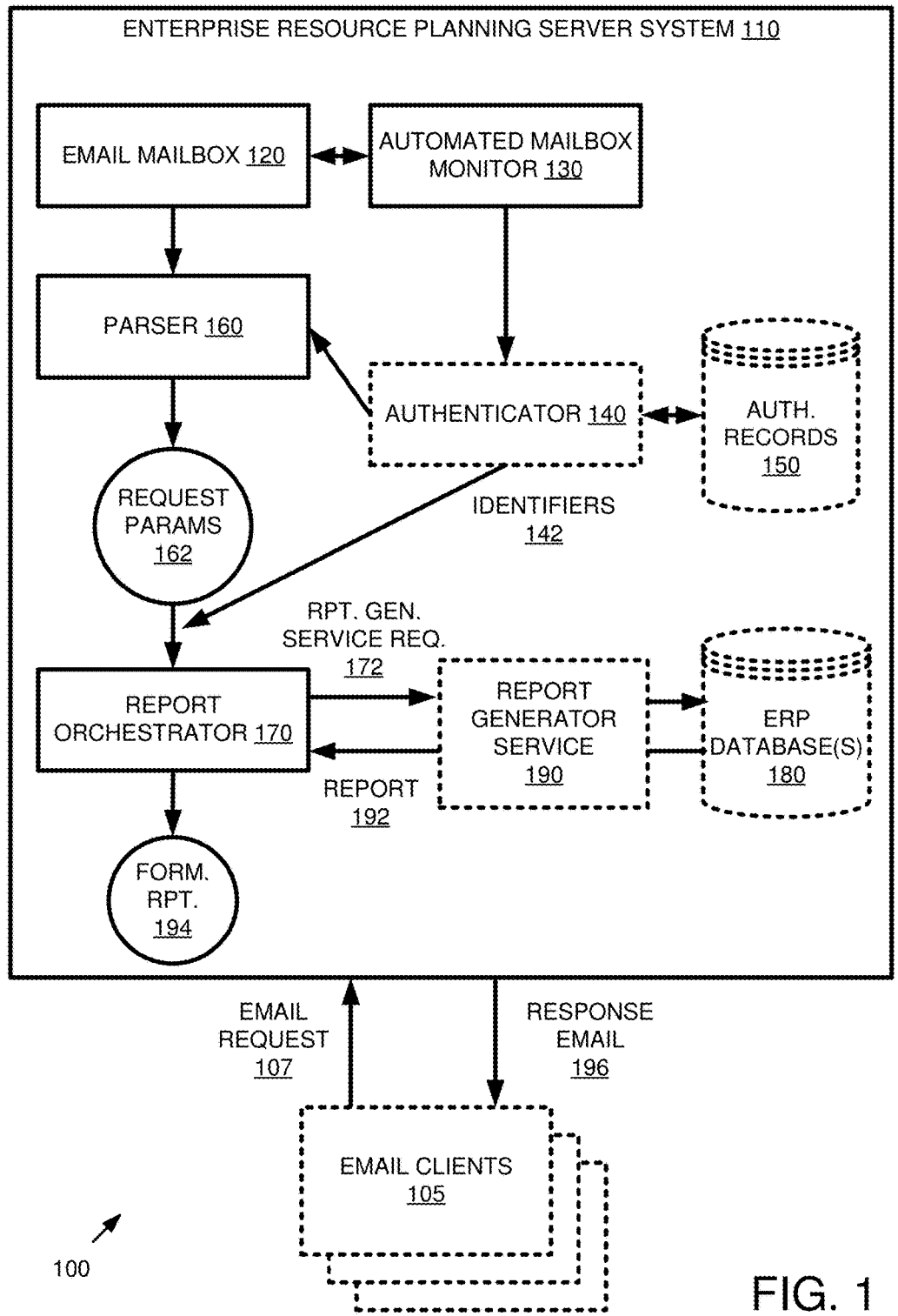
FIG. 1 is a block diagram of an example system for email-initiated report service.

Quick access to company information is central to good decision making. However, the realities of the workplace sometimes interfere with that access. For example, when a key decision maker is away from the office, access to data required to make a decision can be difficult. If the decision maker cannot contact an administrator to generate a custom report required for an instant decision, the decision maker will have to wait, which can cost time and money. In addition, by the time a decision maker receives the report, the data may be stale and not usable for the decision at hand.

Enterprise resource planning databases can contain information relevant to making real-time decisions including transaction databases, management dashboards, business intelligence ("BI") systems, and the like. An enterprise resource planning server system can be used to navigate the databases. Navigation of data within these databases, however, can be difficult for untrained individuals.

Techniques and solutions for an email-initiated report service can be implemented as described herein, including generating custom reports from received email requests. For example, an organization (e.g., an enterprise, association, etc.) can provide a common email address that serves a plurality of users (e.g., employees) associated with the organization. In some implementations, the common email address is a single email address serving users (e.g., employees, managers, or the like) of the organization.

When a user wishes to have a custom report detailing specific company intelligence data, the user can send an email containing report request parameters to the common email address. For example, a senior manager at a company could be in a meeting analyzing her company data with her employees and partners. In order to make decisions at some point in the meeting, she requires data, which is not otherwise immediately available. She may not be able to contact the BI system administrator because she is out of office. To receive the data immediately, the manager can send an email containing the report request parameters to the common email address.

The enterprise resource planning server system can receive the email and process it. If the manager is authorized to receive the requested report, the system can retrieve the information and format the report according to the request parameters. The report can then be sent back the manager for her review.

Example 2

Example Email Address

In any of the examples herein, a special email address can be set up to receive report requests. Such an email addresses can be provided by an organization (e.g., a business) to receive email from people associated with the organization (e.g., individual users, such as employees, owners, contractors, etc.). An email address need not be tied to any specific individual. Instead, the email address can provide a shared address for receiving emails requesting custom reports to be generated. Therefore, it is sometimes called a "common" email address.

In some implementations, a common email address is associated with a use case reason. For example, the use case reason can be requests to receive custom reports related to BI data of the organization (e.g., BOEMail@companyname.com). Common email addresses can be provided for other reasons as well. For example, a common email addresses can be provided for an activity associated with the organization, such as a conference being managed by the organization (e.g., conference2012@organization.com).

A common email address can receive email from one or more users of an organization (e.g., from one or more employees). For example, a single common email address can be provided for an organization for receiving custom report email requests from any number of users (e.g., employees, managers, or the like) of the organization.

As described herein, the email address can direct mail to a mailbox configured to receive and store email messages. An automated mailbox monitor can be configured to monitor (e.g., poll, trigger, or the like) the mailbox for received email messages.

Example 3

Example Email Clients

In any of the examples herein, an email client can be any system capable of composing and sending an email. An email client can be a mobile device, such as a phone, PDA, tablet, wearable, or the like. The email client can also be a laptop or other computing device with an email application configured to send email. The email client can also be a virtual client residing in a cloud computing environment, accessed by a device (e.g. mobile device, computing device, or other device) capable of accessing the cloud computing environment.

The email client can be an automated system to generate an email without user input. For example, an application for displaying a report can determine if the report is out of date. When the report is determined to be out of date, the application can automatically generate a report request email requesting an update of the report. The application can send the email to the common email address using the credentials of the user logged into the system.

Example 4

Example Enterprise Resource Planning Server System

In any of the examples herein, an enterprise resource planning server system can be part of a flexible and scalable information technology infrastructure. An enterprise resource planning server system provides flexible systems management for an enterprise BI standard that allows administrators to confidently deploy and standardize their BI implementations on a proven, scalable, and adaptive service-oriented architecture. For example, an enterprise resource planning server system can comprise software (e.g., business objects software or the like) to compile and analyze BI data.

The enterprise resource planning server system can include business objects applications, email applications, databases containing BI data, databases containing authorized users, network connections, and the like.

Example 5

Example System for Email-Initiated Report Service

FIG. 1 is a block diagram of an example system 100 configured to receive an email request containing report parameters, generate a request for the report, and send the report back to the original requestor.

In the example, one or more email clients 105 can send an email request 107 to an enterprise resource planning server system 110 to request a custom report 194. Although a single box 110 is shown, in practice, functionality can be divided among a plurality of machines working together. As described herein, the email request 107 is sent to a common email address and includes one or more report request parameters (e.g., specified as name-value pairs or the like).

The enterprise resource planning server system 110 includes modules to process the email request 107 and, ultimately, send a response email 196 containing the formatted report 194.

The enterprise resource planning server system 110 receives the request email 107 in an email mailbox 120. The email mailbox 120 is configured to receive and store email messages.

An automated mailbox monitor 130 (e.g. a scheduler written in suitable programming language, such as Java) can be configured to monitor the email mailbox 120 for received email messages (e.g., new incoming requests as indicated by receiving an email). The email itself can be processed, or a separate request data structure representing the email can be generated and processed as the process progresses. In either case, the email at this point can be called a "request." Such a request can provide rich data that goes beyond the text of the email (e.g., sender, email headers, and the like). When processing emails, the mailbox monitor 130 can delete the email, mark it as read, or the like.

Information from the request is sent to an authenticator 140 to determine if the user sending the email 107 is authorized to use the system. For example, the sender's email address can be extracted from the request and sent to the authenticator 140.

The authenticator 140 can be configured to determine an identity of a sender of the received email messages. The authenticator 140 can determine that the sender is authorized to use the system by comparing the email address to authentication records 150 listing authorized users. If the sender of the request is authorized, the authenticator 140 can allow the request to be further processed. Otherwise, a report is not provided. The authenticator 140 can also determine identifiers 142, further describing the identity of the sender of the request. The identifiers 142 can include a group identifier and a position identifier, as discussed herein. If the sender of the request is authorized to use the system, the request can continue to be processed (e.g., by the parser 160). For example, the authenticator 140 can allow the request to pass from the email mailbox 120 to a parser 160. Alternatively, the authenticator 140 can pass the request to the parser 160.

The parser 160 can be configured to extract one or more report request parameters 162 from the received email message. It can also send the parameters 162 to a report orchestrator 170.

The report orchestrator 170 can request the identifiers 142 from the authenticator 140, or the authenticator 140 can send the identifiers 142 to the report orchestrator 170.

The report orchestrator 170 can be configured to request a report based on the extracted report request parameters. For example, it can transform the report request parameters 162 into a report generator service request 172 with report generator service request parameters in order to request the report from a report generator service 190, which can query enterprise resource planning database(s) 180 (e.g. comprising a BI data repository or the like). The orchestrator 170 can perform or direct any of a variety of other tasks as described herein to accomplish the report generation and delivery functions.

In some cases, transformation can include mapping of individual parameters. For example, report request parameters 162 can be name-value pairs that are mapped to different values in the report generator service request 172. The report orchestrator 170 can thus map commands and parameters from name-value pairs to whatever format is desired by the report generator 190.

In other implementations, transformation can include constructing a report generator service request 172 with an application programming interface (API). For example, an API can be called to generate a request and populate it with the report generator service request parameters that are drawn from or mapped from the request parameters 162.

An example implementation using an API can transform request parameters 162, such as Report Name (e.g., "Sales Report"), sender identity (e.g., sender's email address), Format (e.g., "PDF"), etc., report generator service request parameters conforming to an API syntax and used to invoke report generator service 190 functionality. Transformation can include placing the parameters in the correct order in an API call. For example, in an implementation using a report source document that defines the report, an API method called "scheduleDocument" to invoke the document and generate the report can be invoked as:

scheduleDocument ("salesReport", "CEO@sap.com", "PDF" . . . .);

In addition, the report orchestrator 170 can limit the report request 172 based on identifiers 142. For example, only certain reports can be made available to users based on the group identifier and, further, only certain types of data within those reports can be made available based on the position identifier. Alternatively, the group and position identifiers can be passed on to the report generator service 190 to implement access control or report filtering.

The report orchestrator 170 can retrieve data from enterprise resource planning database(s) 180 directly, or the report orchestrator 170 can use an external report generator service 190 to request a report 192. The report orchestrator 170 can then receive a report 192 based on a report generator service request 172. Formatting to provide a formatted report 194 can be achieved by the report generator service 190 or orchestrator 170.

The formatted report 194 can be attached to a response email 196 and sent to the sender of the email request 107. For example, the report orchestrator 170 can create an email response 196 to the requesting email address, attach formatted report 194 to the email response 196, and invoke mail functionality at the server system 110 to send the report.

The system 100 can also perform other processing when receiving email messages addressed to a common email address. For example, the system 100 can perform spam filtering, anti-virus filtering, etc.

The described computing system can be networked via wired or wireless Internet connections. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., one or more processor units, computer-readable memory, and the like). In any of the examples herein, the inputs, outputs, requests, parameters, and databases can be stored in one or more computer-readable storage media or computer-readable storage devices.

Example 6

Method for Generating a Custom Report from a Received Email

Figure 2:
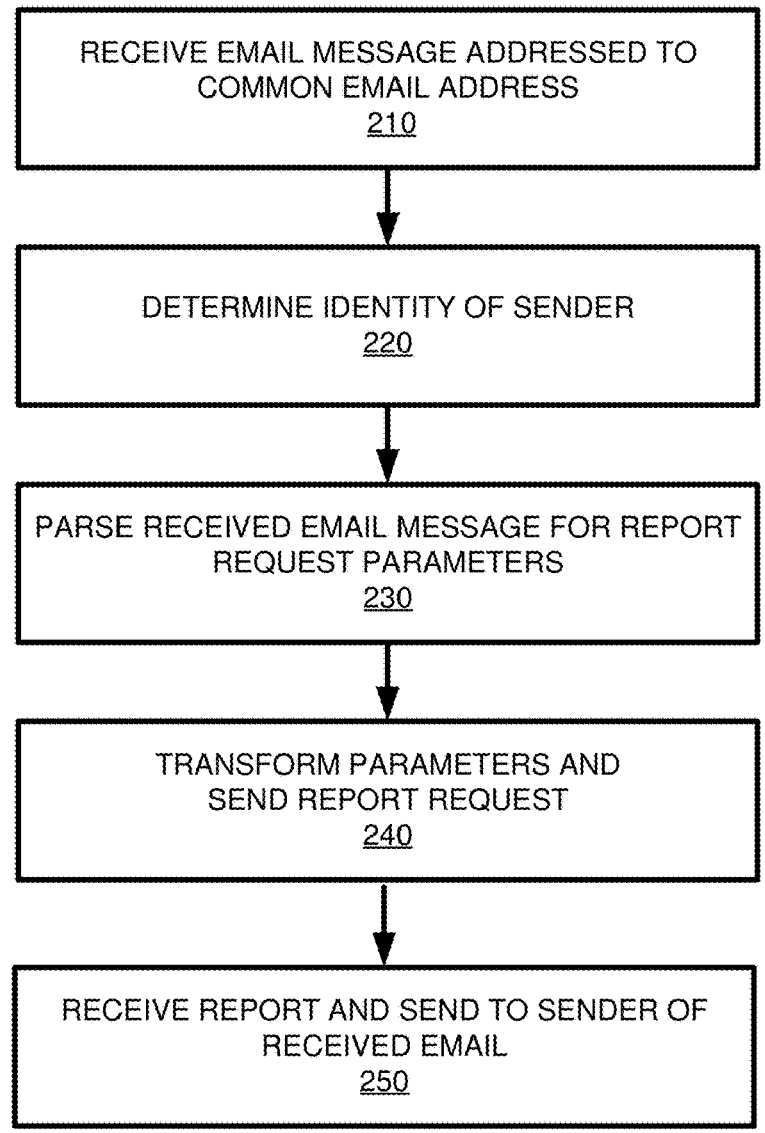
FIG. 2 is a flowchart of an example method of generating a custom report from a received email in an email-initiated report service.

In any of the examples herein, methods can be provided for an email-initiated report service (e.g., custom reports generated by email). FIG. 2 is a flowchart of an example method 200 of generating a custom report from a received email, and can be implemented, for example, in the system shown in FIG. 1.

At 210, an email message addressed to a common email address is received. The email message can contain one or more report request parameters as described herein. The email message thereby initiates a request for a custom report according to the technologies described herein.

At 220, the identity of the sender of the email message is determined. For example, the email address from the sender can be used to determine the sender's identity as described herein. An identity can comprise multiple parts as described herein.

At 230, one or more report request parameters are extracted from the email message. For example, the email message can be parsed to extract report request parameters specifying the report to be generated. As described herein, the report request parameters can be name-value pairs using keywords to specify report generation variables.

At 240, the report request parameters are transformed into a report generator service request. The request comprises one or more report generator service request parameters that can be based on the extracted report request parameters. The report can be requested by sending the report generator service request to a report generator service with access to the data required to generate the report. For example, as described herein, an API call can be made to schedule fulfillment of the report request.

If desired, the report request parameters can be mapped to report generation parameters. The report generation parameters can be used to retrieve data from enterprise resource planning database(s), and the data can then be used to generate the requested report.

At 250, the custom report, containing data as specified by the report request parameters, can be received (e.g., from an external report generator, responsive to the request) and sent back to the sender of the request email message. The report can be packaged in a reply email sent to an email address specified by the identity of the sender.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices) such as the enterprise resource planning server system or the like.

The illustrated actions can be described from alternative perspectives while still implementing the technologies. For example, "receive email in an email mailbox" can also be described as "send email to an email mailbox."

Example 7

Example Determining the Identity of Senders

In any of the examples herein, an identity of a sender of a received email message can be determined. For example, a list of individuals and their associated email addresses can be maintained. When an email message addressed to a common email address is received, the sender of the email message can be determined based on the sender email address. From the sender email address, the identity of the individual sender can be determined, as described herein.

A person associated with an organization can have several email addresses, such as one or more work email addresses and/or one or more personal email addresses. An organization can maintain a list of individuals associated with the organization along with their work and/or personal email addresses in an authorization database. When receiving an email message addressed to a common email address, the sender address can be checked to see if it matches an email address in the list, and the individual associated with the email address can be determined (e.g., by name, employee identification number, etc.). Security policies can be enforced as desired.

Example 8

Example Email Request

In any of the examples herein, a user can send an email requesting a custom report to an enterprise resource planning system.

Figure 3:
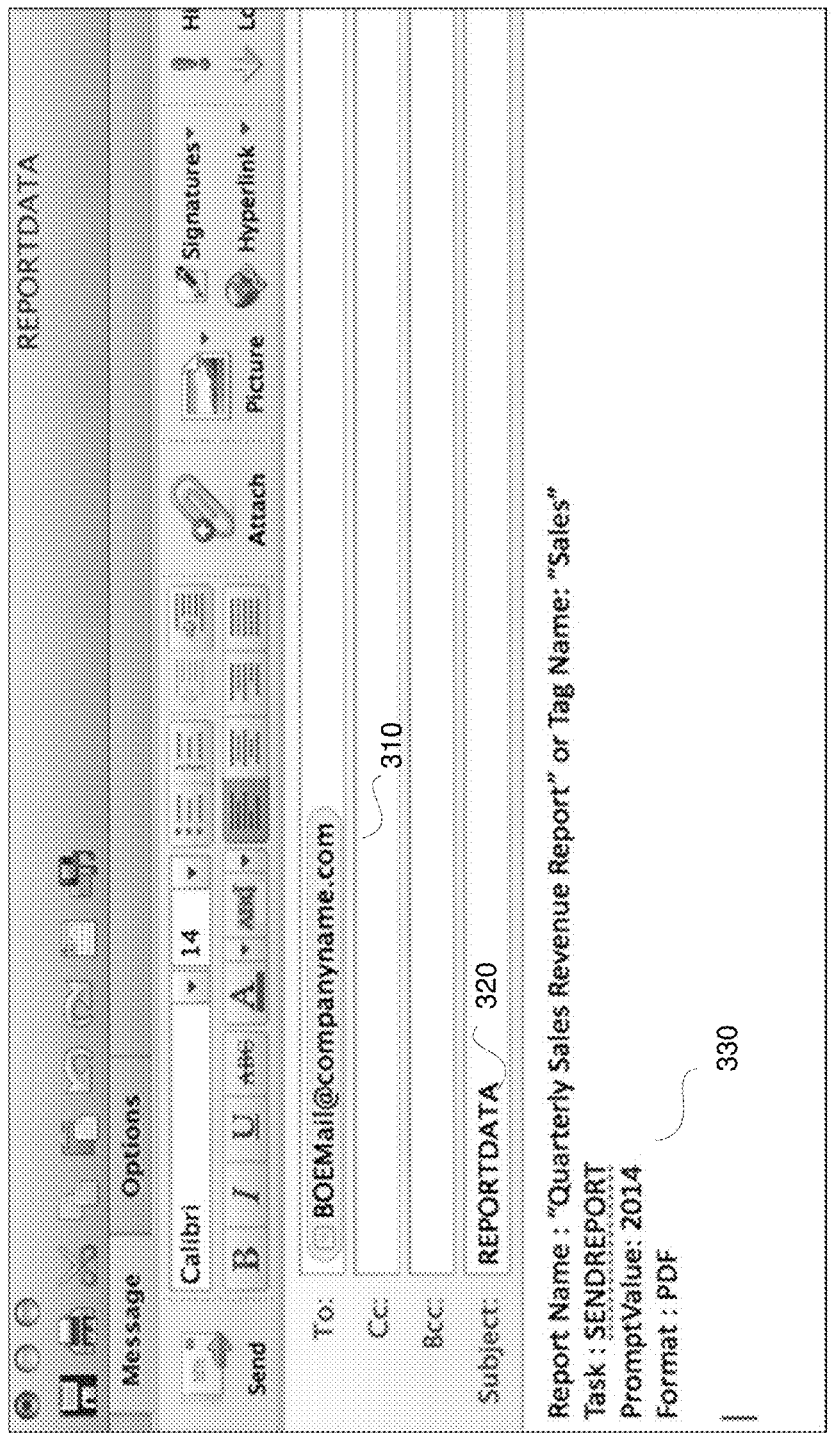
FIG. 3 is an example email sent from a client device to a common email address.

FIG. 3 depicts an example email 300 received by the enterprise resource planning server system, for example as shown in FIG. 1. The email is written by the user requesting a custom report. The email is sent to a common email address 310. The common email address can receive email for report requests from a plurality of users.

The email can comprise a subject line 320, informing the enterprise resource planning system of the type of data requested for the report. Alternatively, the subject line can specify a value for one of the report request parameters (e.g., report name or the like).

The received email typically has an email body 330 comprising report request parameters. In the example, a series of name-value pairs is used. These name-value pairs can determine the report request parameters. Each name in the name-value pair signifies a report request parameter name used to classify the associated value. The associated value can be used to create report generator service request parameters, which are used to retrieve report data from database(s) as described herein.

Two alternatives for "Report Name" are shown. In the first example, the entire report name is spelled out. In the alternative, a partial name (e.g., a single word "Sales") is specified, and the system searches the available reports (e.g., available to the sender) to find a report that matches the partial name.

Example 9

Example Custom Report

In any of the examples herein, a custom report can include information retrieved from an enterprise resource planning ("ERP") database (e.g., BI data store) as specified by the sender of a report request email. For example, if the sender requests "Quarterly Sales Revenue Report," the email-initiated report can contain BI data presented in a predefined organization, as defined in a report orchestrator or report generator service, displaying sales revenue from quarters specified in the report request. The organization of the report (e.g., how the information is arranged in the report) can be predefined based on the report type. A full set of report types can be stored in either the report orchestrator or the report generator service. The report can be formatted in a requested format, such as PDF, XLS, DOC, etc.

A custom report can be attached to an email and sent to the sender of the request email as described herein. Alternatively, the custom report could be saved in a central file location, such as a cloud storage network, or other networked storage device, for retrieval by the requester of the custom report. For example, a link to the report can be sent in the response email. Or a simple notification that the report is ready can be sent.

Example 10

Example Report Source Document

Figure 4:
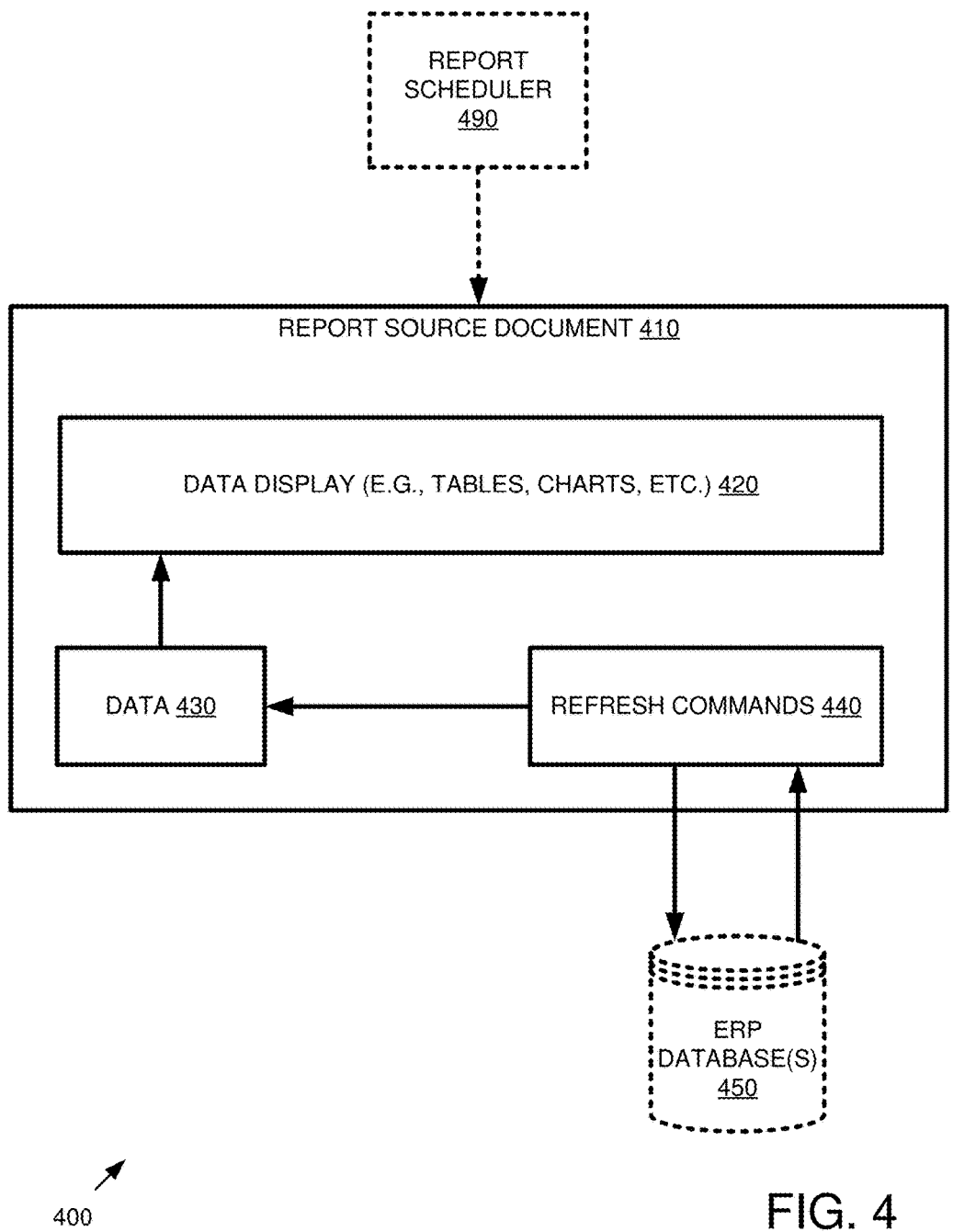
FIG. 4 shows an example report source document with integrated commands to refresh report data.

In any of the examples herein, a report source document can define what is included in a report, arrangement of the data, the source of the data, and the like. FIG. 4 shows an example report source document 410 that can be invoked by a report scheduler 490 to create an instance of a report based on the ERP database 450 that is then provided to the end user via email. The report source document 410 can be identified by a name, such as a report name, report type, or the like. It therefore can be explicitly specified or partially specified in the requesting email as described herein.

In practice, a report developer creates the report source document ahead of time (e.g., before the report is requested) and saves it to the BI repository. For convenience, the report source document is sometimes simply called a "report," although the actual resulting report that an end user sees is generated from the report source document. Because report requests can be automated as described herein, the end user does not need to be aware of the report source document or how it operates.

The report source document can accept input parameters (e.g., filters and the like) to influence report generation as described herein. Operations such as converting a table into a chart, sorting data, refreshing the document, and the like can be supported.

The source report document 410 can include retrieved data 430. The refresh commands 440 (e.g., SQL or other language) can be integrated into the source document 410 and retrieve the latest data from the database 450 into the retrieved data 430 when executed. The data display 420 can contain the actual data of the report (e.g., what the end user eventually receives via email), which is based on the retrieved data 430. For example, the data can be displayed in tables or graphs suitable to convey the information contained in the retrieved data 430 to a user.

Thus, the source report document 410 can include commands 440 to retrieve data from an ERP database 450. Such integrated commands can allow for automatic report refreshing. Such commands can be implemented as report generator service request commands. As described herein, a scheduler 490 can initiate data refresh of the report according to and responsive to the received email. The scheduler 490 can invoke processing of the source report document 410 by specifying it in an API call as described herein.

A wide variety of report source documents can be supported. For example, Web Intelligence ("webi"), Desktop Intelligence ("deski"), Crystal Reports, Xcelsius Dashboards, and the like can be supported.

Example 11

Example Report Request Parameters

In any of the examples herein, report request parameters can be determined from the received email, for example as shown in FIG. 3. One way of specifying parameters is to use name-value pairs. The names comprise a predefined number of keywords recognized by the enterprise resource planning system. For example, report request parameters can comprise the keywords "report name" or "tag name," "prompt value," "task," "format," and "when" as described herein. Other report request parameters can be specified, such as who to send a report to, report retrieval methods, report organization parameters, etc. In other words, report request parameters can comprise a set of parameters similar to those that are available to an administrator of the enterprise resource planning system.

The parameters can also be specified by virtue of where they appear in the email text (e.g., name is first, prompt value is next, format is next, and the like). Parsing can use other techniques as desired.

"Report name" can specify the name of the predefined report available to be requested, as described herein. It can be the entire name as stored in the report orchestrator or report generator or a portion thereof. Transformation can include transforming the report name to report type recognized by the report generator service (e.g., if a portion of the type is found in the name).

"Tag name" can be an abbreviated or shorted version of the full report name. For example, if the sender of the email cannot remember the full report name, the sender can specify a portion of the full report name, and the report orchestrator or report generator can determine the desired report based on the tag name.

"Task" can specify the action that the user is requesting the enterprise resource planning system to take. For example, "SENDREPORT" can specify the action to email a custom report back to the sender of the request. If no task is specified, it can default to sending the report.

"Prompt value" can specify a parameter specific to the type of report requested, as described herein. For example, for "Quarterly Sales Report," the user can specify the date range or the number of quarters to include in the report. In general, the prompt value need not always specify the same type of information (e.g., it can specify a timeframe or an organizational unit of a company).

The prompt value can specify a filtering range (e.g., "2014"), and the filtering range can be included in the report generator service request as one of the report generator service request parameters (e.g., to limit the report as indicated by the filtering range).

"Format" can specify the form of the custom report as delivered to the sender of the request email. For example, the report can be formatted as a portable document file ("PDF") or as a Microsoft Excel® spreadsheet ("XLS"). The value of "Format" can be any document format supported by the enterprise resource planning system.

Thus, the report request parameters can include a report format that specifies a format of the custom report. The report format can be included in the report generator service request as one of the report generator service request parameters (e.g., to instruct the service to generate a report of the specified format).

"When" can specify when the report is to be run. A default of "now" can be explicitly specified, or a date and time (e.g., 20 Apr. 2015 15:00) or the like can be specified.

Values associated with the keywords can be separated from the keywords by a separator, such as ":", "=", or other suitable character. The values can provide the enterprise resource planning system with information narrowing a search of a report database.

The keywords for the report parameters need not be the same words as described above. Any other words (e.g., descriptive of the desired content of the report) can also be used. For example, "Date" can be used instead of "When" and so forth.

Example 12

Example Report Generator Service Request

In any of the examples herein, a report generator service request can be a request that is used to retrieve a report from a report generator service or a set of report records. The report generator service request can comprise mapped report request parameters, which can be mapped from the parameters extracted from the request email into a suitable form to communicate with the report generator service or query the enterprise resource planning database(s). For example, report request parameters can be extracted from the request email and then translated into a form required by the report generator service (e.g., various parameters, filters, or the like).

As described herein, the request can take the form of an API call with service request parameters (e.g., transformed from report request parameters) to a scheduler, which handles the details of fulfilling the request.

The report generator service request can be formatted to increase the speed of retrieval of a report. For example, the report generator service can support a plurality of predetermined reports arranged within a database. The report generator service request can be formatted such that only a subset of the predetermined reports are searched, thus increasing the speed of report retrieval.

Example 13

Example Report Name

In any of the examples herein, the report can be requested by a user by a keyword specifying the entire report name or a keyword specifying a shortened portion of the report name. For example, the user can request a report using a "tag name" keyword with a value of "Sales" to receive a "Quarterly Sales Revenue Report." Alternatively, if the user knows the title of the report, the user can request the report with a "Report Name" keyword and a value of "Quarterly Sales Revenue Report." The "Report Name" keyword can also support keyword searching if desired.

If the user specifies the report using a keyword such as "tag name," the report orchestrator or report generator service can compare the value associated with it to a list of available reports and choose the report most closely relating to the value. In another embodiment, the identity of the sender of the request email can be used to determine the requested report type, as described herein. For example, a user belonging to a group indicating executive status (e.g., the user is a vice president) can receive a "Sales Overview Report," if the sender requests "sales." Whereas, a user belonging to Mid-Atlantic Sales Division can receive a "Mid-Atlantic Quarterly Sales Report" when requesting "sales." In other words, the specific report that the user receives can depend on the group identification and/or the identity of the sender of the request email.

Example 14

Example Prompt Value

In any of the examples herein, information content of the requested report can be specified by the user with a prompt value. The prompt value can depend on (e.g., vary based on) the requested report type. For example, for one type of report (e.g., "Sales Report") the prompt value can be a specific timeframe for information contained in the report (e.g. a year, such as "2014"). For a different report type, such as "employee sales" the prompt value can be the name of the employee.

In another example, the prompt value can be used to determine the type of report based on its value. For example, if the tag name "sales" is specified and the prompt value of "2014" is used, then a report can be requested that contains all sales data for the year 2014. But if the same tag name of "sales" is used and the prompt value of "Bob" is specified, a request can be made for all of the sales data for the employee named "Bob." In other words, the prompt value can be used to resolve an ambiguous report name.

Furthermore, the information contained in the report can depend on the identity of the sender of the request email, as described herein. For example, the identity of the sender can include a position (e.g., manager or non-manager) for the sender within a group (e.g., human resources). Depending on the position of the sender, the report orchestrator can configure (e.g., map) subsets of the prompt value into the report request. For example, if a low level manager (e.g., specified by the position identifier) requests "Quarterly Sales Report" with a prompt value of "2014," that user can only receive a report with bottom line sales figures. But if the same report is requested by a senior manager, the report can contain intermediate sales information, such as broken up by employee.

Example 15

Example Report Format

In any of the examples herein, a report format can be the file format in which the report is presented to the user. The report request parameters can have a keyword indicating the desired report file format (e.g., "Format") with a value specifying which file format in which to save the report. The report can be saved by the report generator service in the specified file format and sent to the report orchestrator. Alternatively, the report orchestrator can receive a report from the report generator service in a default or raw format, and the report orchestrator can save the report in the specified file format.

Example 16

Example Sender Identity

In any of the examples herein, a sender identity can take a variety of forms. For example, the sender's email address can be used as an identity. However, identity can take on compound forms such as a group identifier, a position identifier, and the like.

In any of the examples herein, the identity of a sender can comprise a group identifier that identifies a group of the sender and a position identifier that identifies the sender within the group.

Based on the authenticated identity of the sender, available report types can be restricted (e.g., based on group identifier). Further, based on the authenticated identity of the sender, available prompt values can be restricted (e.g., based on position identifier).

Example 17

Example Authentication of Email Sender

Figure 5:
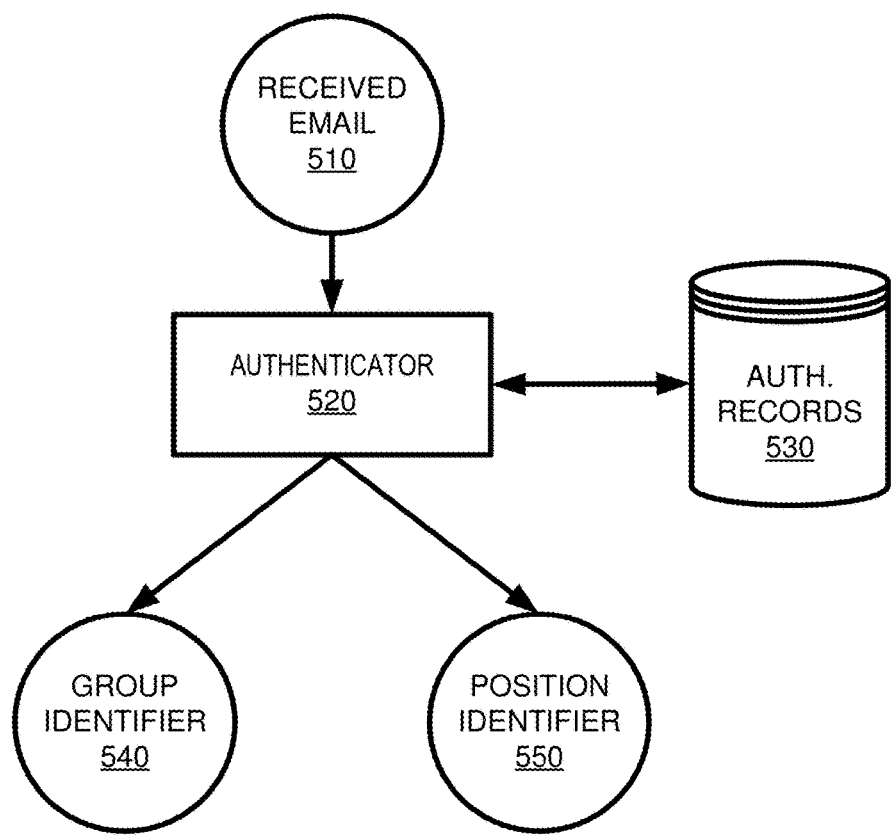
FIG. 5 is block diagram of an example authentication of a received email.

FIG. 5 is a block diagram of an example data flow 500 for authentication of an email sender. The authenticator 520 can be part of an enterprise resource planning server system, as shown in FIG. 1. Alternatively, the authenticator 520 can be a service performed externally to the enterprise resource planning server system (as shown with dashed lines in FIG. 1).

The authenticator 520 can be used to identify the sender of a received email 510. The received email 510 can be provided to the authenticator 520 by an automated mailbox monitor that retrieves email in an email mailbox and routes the email for processing. For example, the mailbox monitor can copy the received email or information associated therewith and provide it to the authenticator 520.

The received email 510 can have a return email address of the sender of the email. The authenticator 520 can extract the return email address and compare it to a listing (e.g., database entries) of approved users contained in authentication records 530.

Authentication records 530 can contain records associating authorized users with at least one email address. Multiple email addresses can also be associated with authorized users. For example, a user can have a company email address and a private email address. Authentication records 530 can thus associate the authorized user with both email addresses, to allow the user to receive a custom report via work email or private email. Alternatively, for security reasons, only the work email address can be associated with the authorized user.

Authentication records 530 can also contain information associating a user with a group and position. The group can be a logical group, such a department or a project group, within a company. The group can also be a virtual group, which need not be tied to a logical ordering of users. For example, users associated with a specific task can be indicated as belonging to a group. In such a case, the virtual group can comprise users from many different logical groups. A position can indicate the relative seniority of a group member. For example, managers can have a position indicating a higher degree of authority than a new employee and thus can receive more detailed report information.

The authenticator 520 can retrieve authentication records 530 corresponding to the sender of the received email 510 (e.g., the email address of the sender). The authenticator 520 can then create a group identifier 540 and a position identifier 550 for the sender of the received email based on the group indication and position indication in authentication records 530. The authenticator 520 can then make these identifiers available for use by the enterprise resource planning server.

Example 18

Example Method of Authenticating a Sender of a Received Email

Figure 6:
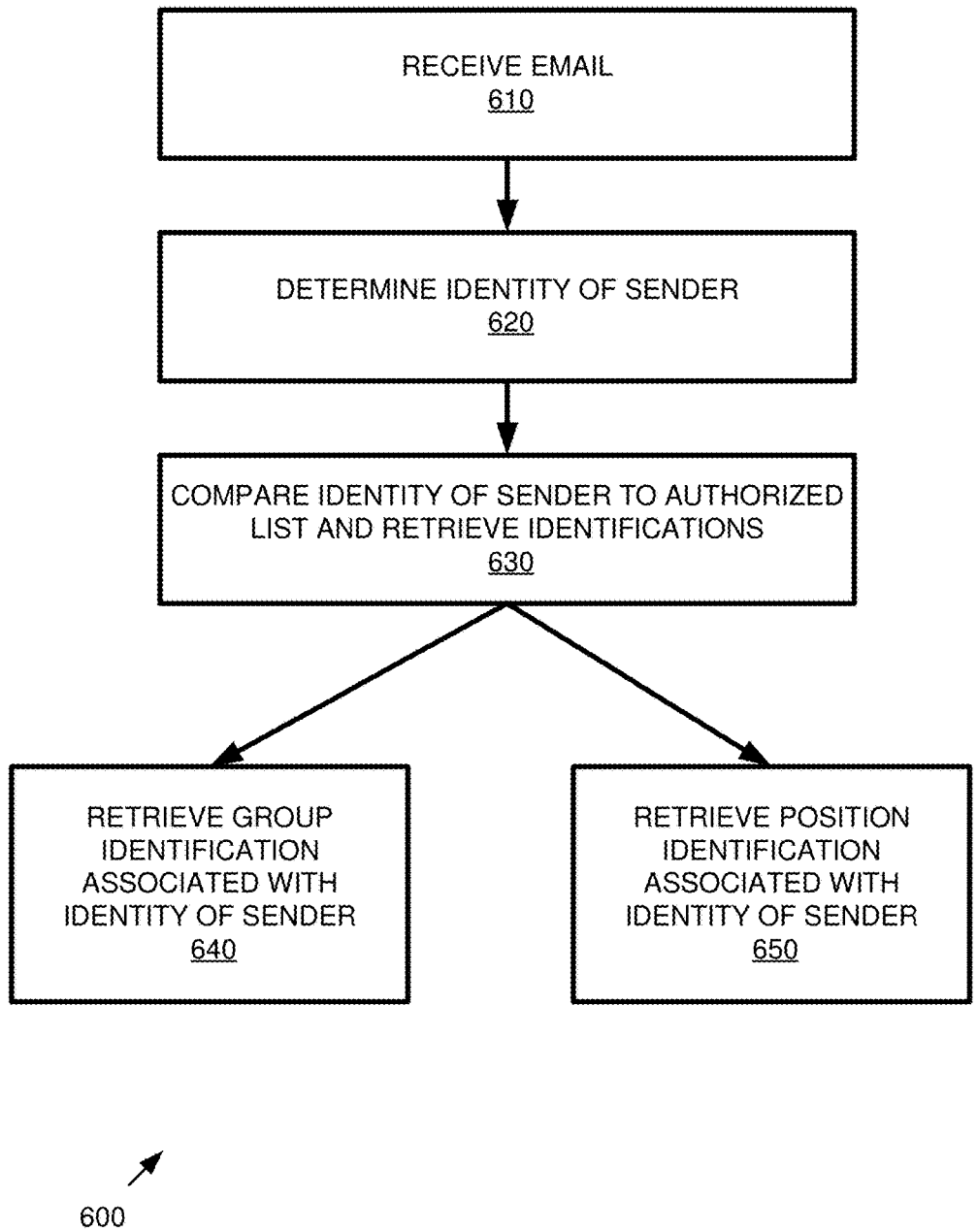
FIG. 6 is a flowchart of an example method of authenticating a sender of a received email.

FIG. 6 is a flowchart of an example method 600 implementing user authentication and can be implemented, for example, as part of the system of FIG. 1.

At 610, an email can be received by an authentication system, for example, over a network connection.

At 620, the identity of the sender can be determined, for example, based on the email address of the sender of the received email. The identity of the sender can be used to allow further processing of the received email. If the sender of the received email is not authorized to receive reports via the service associated with the common email address, the received email can be rejected and not processed. An error message can be sent if desired.

At 630, the identity of the sender of the received email can be compared to a list of authorized users of the system. If the email address of sender is in the list of authorized users the email can be further processed by the enterprise resource planning server system. For example, the authentication system can set a flag indicating that the email can be further processed, it can be sent to the next part of the process, or the like.

At 640, the identity of the sender can also be used to retrieve a group identification. For example, the list of authorized users can also indicate a group association for the authorized user. The group identification can indicate that the sender belongs to a group of authorized senders with similar access rights. The group identification can be used to limit or permit the report type.

At 650, the identity of the sender can be used to retrieve a position identification from the list of authorized users. The position identification can indicate the position of the sender of the received email in the group. For example, position identification can indicate the relative position in a hierarchy of employees in a group. The position identification can be used to limit the data range in the custom report requested by the sender.

Example 19

Example Parsing and Report Generation

Figure 7:
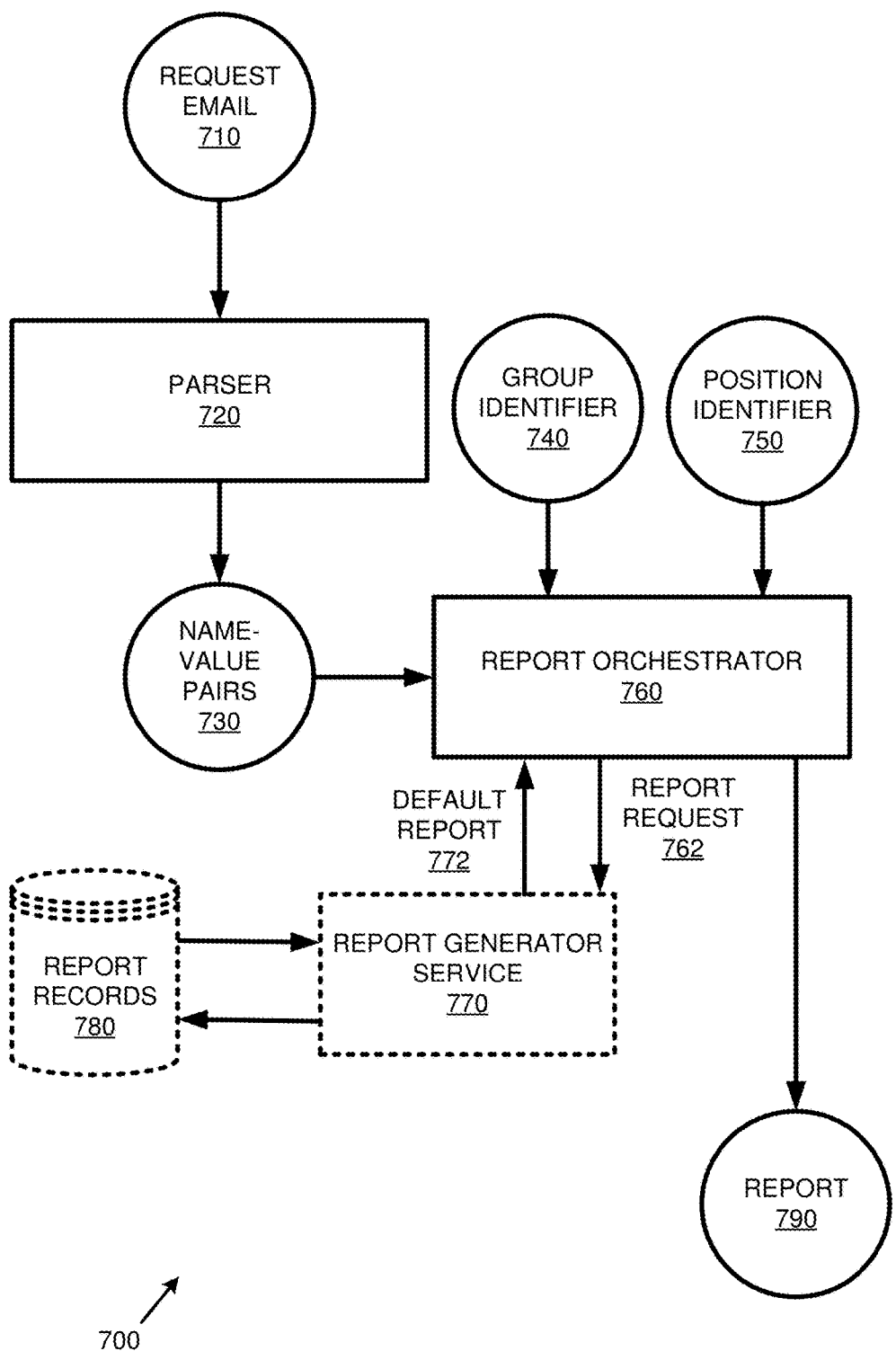
FIG. 7 is a block diagram of an example generating of a custom report based on a received email.

FIG. 7 is an example data flow 700 for converting a request email from an authorized user into a custom report and can be implemented, for example, in the system shown in FIG. 1.

A request email 710 can be authorized by an authenticator and sent to a parser 720. The email can be restricted to passing to the parser only if the identity of the sender of the email is verified to be able to request a custom report.

In the example, the parser 720 parses the request email 710 to extract name-value pairs 730 specifying the requested custom report. The parser 720 can search for keywords (e.g. "report name") and extract the associated value separated from the keyword by a predetermined separator. Alternatively, the name-value pairs can be in a predetermined order such that only the value need be searched and extracted. The name-value pairs 730 can be formatted into report request parameters and sent to a report orchestrator 760.

The report orchestrator 760 can receive the name-value pairs 730 (e.g. report request parameters) and can also receive a group identifier 740 and a position identifier 750. In some cases, the report request parameters may not be in a form suitable to send to report generator service 770 to request a custom report. The report orchestrator 760 can map name-value pairs 730 to a report generator service request 762 that is understood by the report generator 770. For example, if the report generator service 770 requires a series of API calls or SQL query language commands to retrieve data from report records 780 (e.g., enterprise resource planning database(s)), the report orchestrator 760 can transform the report request parameters into an appropriate request as described herein. For example, it can map the name-value pairs 730 into a plurality of SQL commands, as described herein.

The report orchestrator 760 can maintain a listing of available reports that can be requested. For example, the list of reports can be retrieved from report generator service 770 or be separately maintained. The report orchestrator 760 can choose the report for the report generator service request 762 based on the available reports in the list. In this way, the actual report requested can be updated while still using the same name-value pair to request it. Report names recognized by the report orchestrator 760 can be mapped to those recognized by the report generator service 770.

The report orchestrator 760 can use the group identifier 740 and the position identifier 750 to modify the mapped values from the name-value pairs 730 to the report generator service request 762. For example, the report orchestrator 760 can pre-filter the list of available reports so that only certain reports are available to certain groups. Such an approach can speed up report type selection so that the report is created faster and sent back to the sender of the request sooner. The report orchestrator 760 can use the position identifier 750 to modify the requested information in the custom report. Based on the position identifier 750, the report orchestrator 760 can limit the time-range of data that the sender requests, for example.

The report orchestrator 760 can also use the group identification 740 and position identification 750 to resolve which report the sender of the request wants. For example, the list of reports can contain different reports with the same report name, but filtered for different group identifications. In other words, depending on the group identification 740 and/or position identification 750, the report orchestrator 760 can map different report types to the report generator service request 762.

The report generator service 770 can be an external report functionality with access to report records 780. Alternatively, the report generator service 770 can be internal to the enterprise resource planning system. The report generator service 770 can receive a report generator service request 762 and use it to retrieve information from the report records 780. The report generator service 770 can create a report in a default format from the retrieved information. The default report 772 can be sent back to the report orchestrator 760 for final formatting. Alternatively, report request 762 can specify the file format and the report generator service 770 can send a fully formatted report.

The report orchestrator 760 can save the default report 772 in a file format specified in the request email 710 and generate the final report file 790, if not done by the report generator service 770. The report file 790 can be attached to an email and sent back to the sender of the request email 710.

Example 20

Example Method of Parsing and Report Generation

Figure 8:
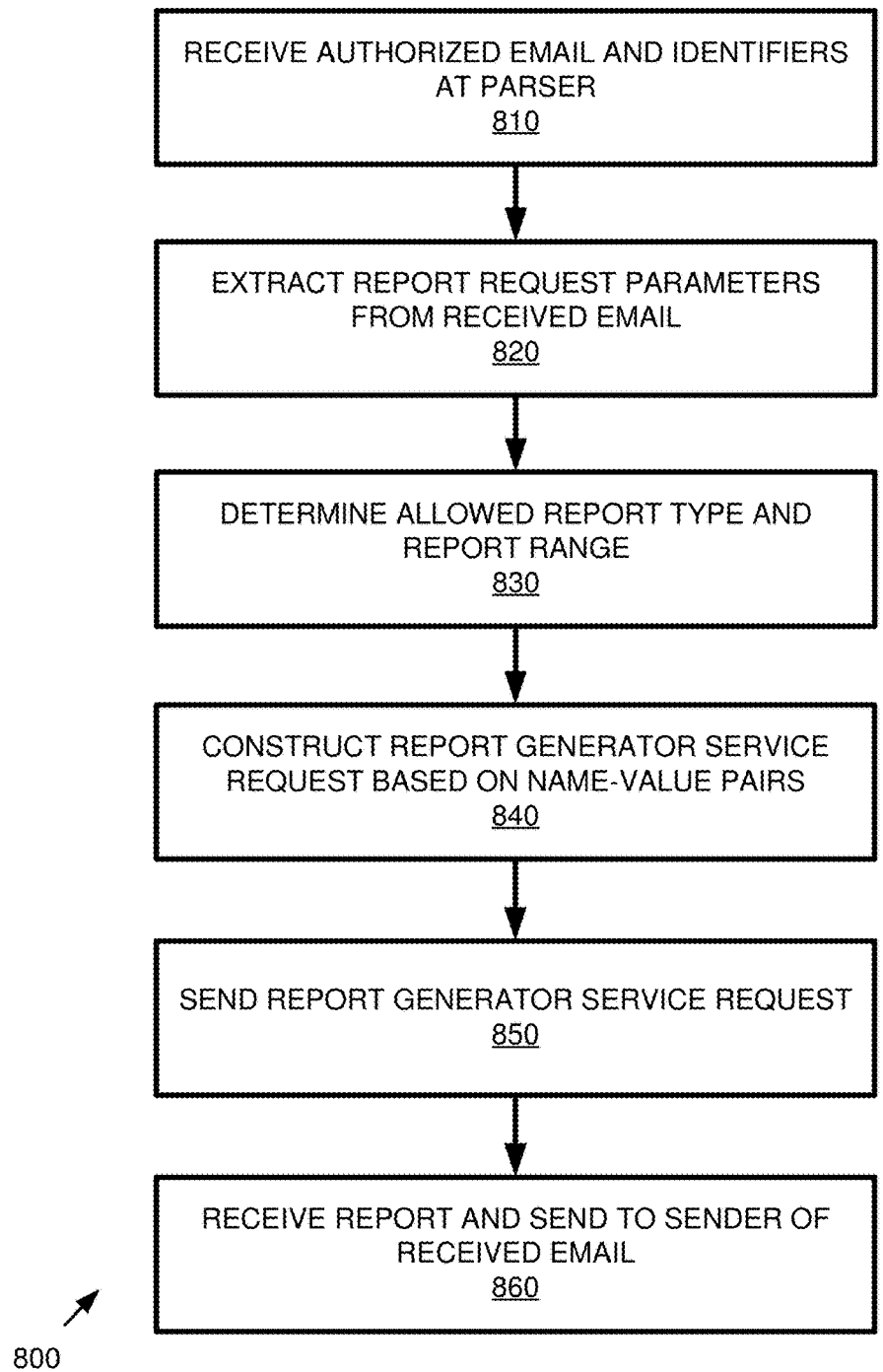
FIG. 8 is flowchart of an example method of parsing and generating a custom report.

FIG. 8 is flowchart of an example method 800 of generating a custom report in response to receiving an email from an authorized sender and can be accomplished using the data flow, such as shown in FIG. 7, in a system, such as shown in FIG. 1.

At 810, a parser can receive an email from an authorized sender. The email can have a format as shown in FIG. 3. The parser can also receive a set of identifiers, which identify the sender of the authorized email. The sender can be authenticated as described herein.

At 820, the body of the email can be parsed to extract report request parameters for the report. As described herein, name-value pairs can be extracted.

At 830, identifiers can be used to determine report types and report ranges. For example, the identifiers can limit the available choices of report request commands. Such limitation can be accomplished by blocking requests for certain reports, mapping requested reports to other names, or the like.

At 840, a report request can be constructed by mapping name-value pairs from the email to a format used to request report data. Each name-value pair can have a plurality of report request commands associated with it. In other words, there does not need to be a one-to-one correlation between name-value pairs and parameters in a report generator service request.

At 850, the constructed report generator service request can be sent to a report generator service to generate a custom report based on the request.

At 860, the custom report can then be received and formatted to a file format as specified by the report request parameters. The formatted report can be attached to an email and sent back to the sender of the email.

Example 21

Figure 9:
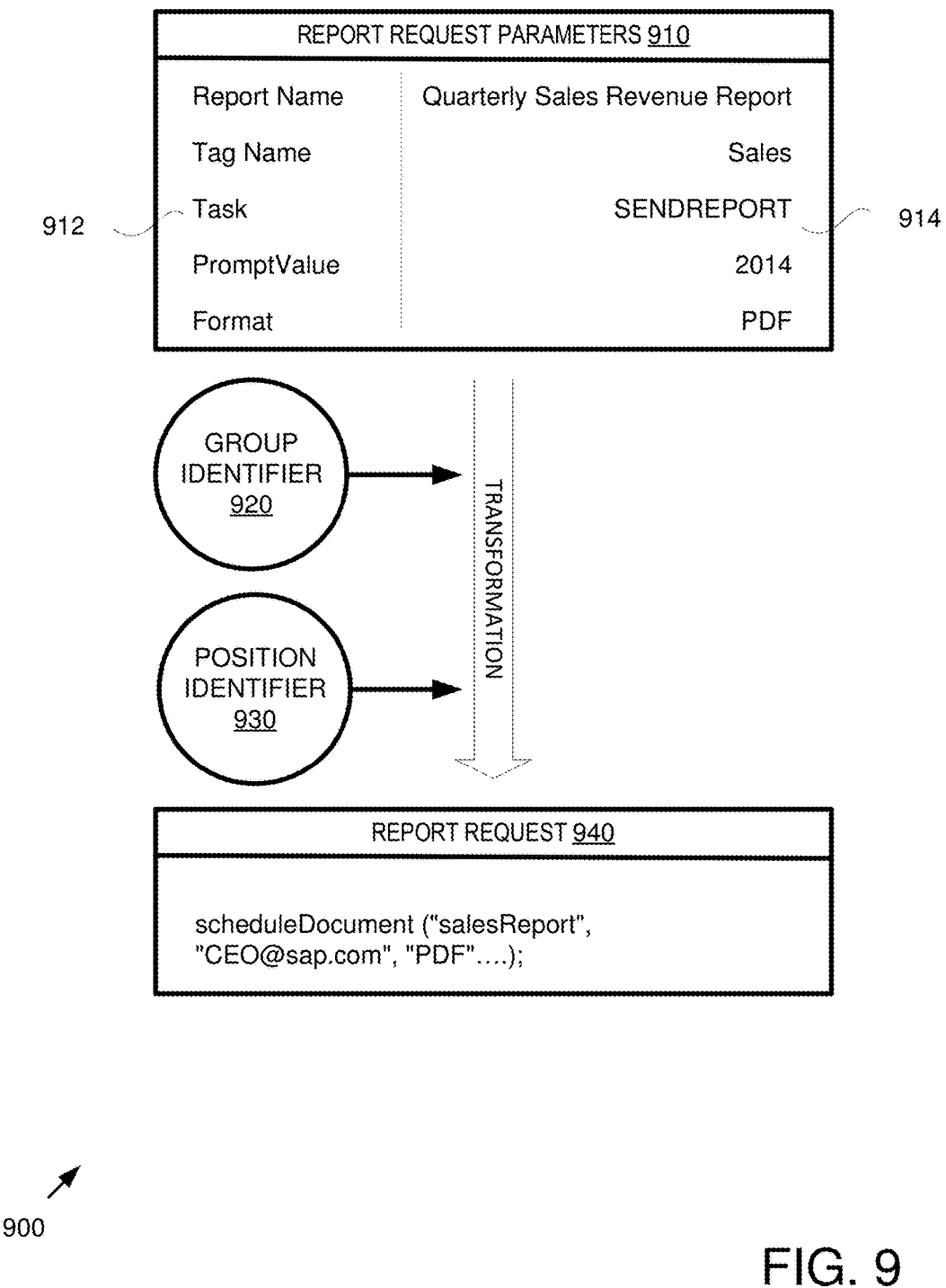
FIG. 9 is an example diagram showing mapping from report request parameters to a report generator service request.

Example Mapping of Report Request Parameters to a Report Generator Service Request In any of the examples herein, report request parameters (e.g., name-value pairs parsed from the request email) can be transformed into a report generator service request for retrieving data from a report records database. Such a service request can include service request parameters. FIG. 9 shows an example transformation implementation 900 of report request parameters 910 to a report generator service request 940.

Report request parameters 910 can contain name-value pairs specifying a custom report that are more understandable by an untrained user of a report generating system. The names 912 and values 914 can be written in the body of a request email and extracted by a parser.

In some cases, transformation can include mapping of individual parameters. For example, report request parameters 910 can be name-value pairs that are mapped to SQL database commands in the report request 940. A report orchestrator can thus map commands and parameters from name-value pairs to different parameter names, different parameter values, SQL query language or whatever format is recognized by a report generator service.

Transformation can include mapping request parameters 910 to report request parameters 940 and can take into account a group identifier 920 and a position identifier 930 to map the name-value pairs into a suitable format (e.g. by calling an API, generating SQL query language, or the like). The group identifier 920 and position identifier 930 can be determined from an identity of the sender of the request email. For example, the group identifier 920 and position identifier 930, or the identity of the sender, can restrict information requested in the report request 940 by mapping only a subset of the report request parameters 910. In this way, access to sensitive data can be controlled and limited to certain users.

As described herein, transformation can include constructing a report request 940 with by an application programming interface (API). For example, an API can be called to generate a request and populate it with the report generator service request parameters that are drawn from or mapped from the report request parameters 910. Or, a single API call can specify the parameters to fulfill the request. Both the parameter names and the parameter values can be mapped (e.g., translated) from a familiar user-friendly form to whatever format is accepted by the report request service.

The report request 940 can be formatted to facilitate retrieval of data from a database containing the requested information (e.g. a BI data store). For example, the report request can call an API method "scheduleDocument" that takes values from report request parameters 910 as input variables (e.g., scheduleDocument ("Quarterly Sales Revenue Report", "CEO@sap.com", "PDF", . . . .))

In any of the examples herein, transforming the report request parameters 910 can comprise mapping name-value pairs from the report request parameters 910 to the report request 940, wherein the report request 910 specifies report limitations based on the identity of the sender.

When the report request parameters include a requested report name, transforming can comprise comparing a requested report name to a plurality of available report types and setting a report type of the report generator service request to an available report type out of the plurality of available report types that matches the requested report. Such available report types can be based on the identity of the sender.

Example 22

Example Automated Mailbox Monitor

In any of the examples herein, an automated mailbox monitor can be a module that detects when email is present in an email mailbox. Although any number of automated mailbox monitors can be implemented, one example takes the form of a Java scheduler in the enterprise resource planning server system. The scheduler monitors the email mailbox of the common email address. The scheduler detects any unread email messages in the mailbox and sends them for further processing (e.g., to an authenticator or the like), as described herein. Thus, the monitor can trigger generation of the report.

Example 23

Example Reply Email with Report

In any of the examples herein, a user who sends an email request for a custom report can receive a reply email containing the requested report.

Figure 10:
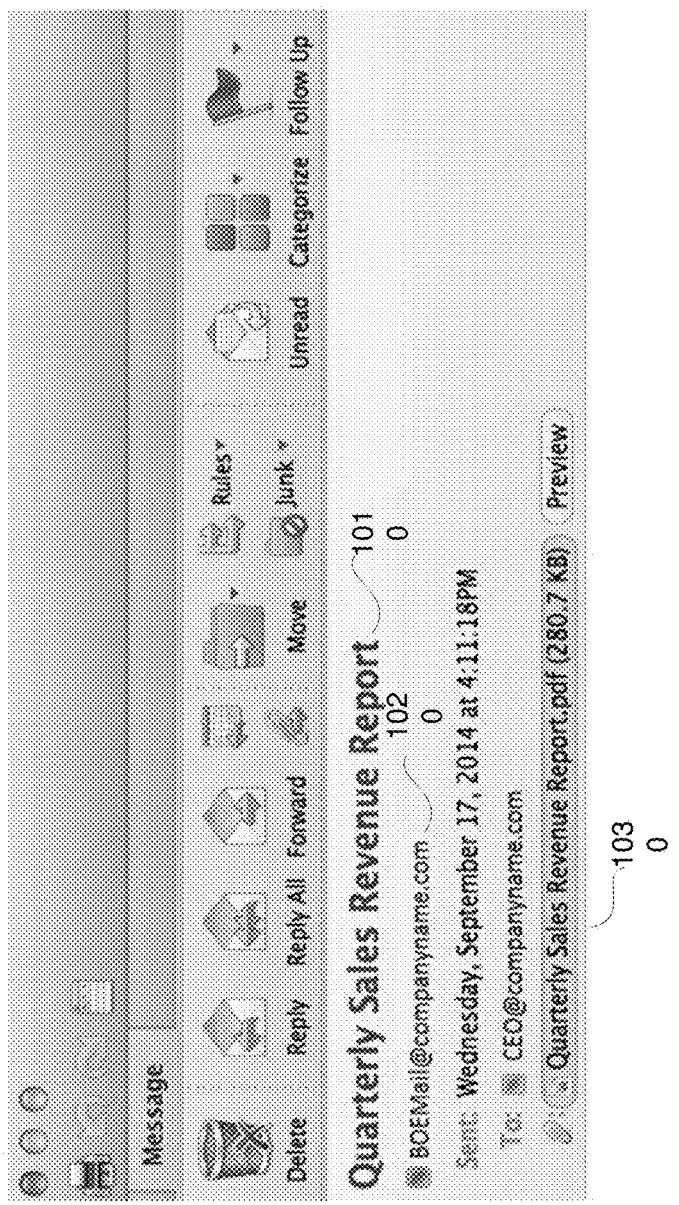
FIG. 10 is an example email received at a client device in response to an email requesting a custom report.

FIG. 10 depicts an example reply email message 1000. The reply email message 1000 can be sent to the email address of the sender of the request email. Alternatively, the user can have an associated default email address where reply emails are sent, regardless of the email address of the sender of the request email.

The reply email can contain a subject 1010 announcing the contents of the email. The subject 1010 can be shown in a listing of received emails in an email client, such as shown in FIG. 1, to inform the user of the contents of the reply email.

The reply email message 1000 can also have a return email address 1020 set to the common email address. This can facilitate requesting subsequent custom reports.

The reply email 1000 can have the custom report 1030 included as an attachment. Alternatively, the report 1030 can be specified by a link or a simple announcement that the report is available at a location from which it is known to be retrievable. The custom report 1030 can be in a file format as requested by the sender of the request.

Example 24

Example Report Scheduler

In any of the examples herein, a report scheduler can be implemented to automatically initiate generation of a requested report. The scheduler can be part of the report orchestrator, for example shown in FIG. 1. Alternatively, the scheduler can be part of the report generator service, or it can be a separate functionality. For example, a report orchestrator can sit on top of the report scheduler and submit report requests to it.

The scheduler can receive transformed report request parameters as described herein (e.g., via an API call), which are then used to generate the report in conjunction with a report source document (e.g., which is chosen based on a specified report name or report type). For example, such parameters can indicate that the requested report should be sent at a later date or time. The email request can specify, in addition to other name-value pairs, a "date" or "time" keyword (with associated value) specifying a timeframe parameter for the requested report to be generated. These request parameters can be stored in the scheduler and the report can be requested at the specified date or time.

Requests without a date or time (e.g., by default) can be scheduled for execution immediately.

As part of the scheduling process, the scheduler can invoke a refresh functionality to refresh the report source document, thereby leading to up-to-date report results. Refresh functionality can be controlled by parameter if desired, but is typically automatically invoked by default.

Authorization to use the scheduler functionality can be controlled by the authenticator. For example, only individuals with appropriate permissions (e.g., of a seniority) can schedule reports for future dates. Additionally, identifiers (e.g., group identifier or position identifier) can be used to limit the type of scheduling allowed by an email sender.

Example 25

Example Advanced Report Features

In any of the examples herein, the email-initiated report service can comprise advanced features to schedule and dynamically update an email-initiated report.

A request email can include report request parameters to schedule a report for delivery at a specified date and time. For example, keywords of "date" and "time" can be included in the body of the request email to specify that the user would like the report to be generated and sent at a specific time in the future. The advantage of requesting the report be generated later is that the most recent data can be included.

A report scheduler, as described herein, can receive report request parameters and trigger the custom report to be generated based on those parameters. For example, the report can be requested for "20 Apr. 2015 15:00," and the scheduler can trigger the report to be generated at such time and date. Alternatively, the date or time can be specified as "now," in which case the custom report can be generated immediately. If not time is requested, it can default to "now."

The scheduler can be part of the report orchestrator, the report generator service, or a separate functionality of a system, such as the enterprise resource planning system shown in FIG. 1.

A custom report can be dynamically updated by embedding refresh commands in the report source document, as described herein. The report source document can then retrieve data from ERP database(s), for example, when the data is out of date, or the scheduler triggers the report to update its data.

Example 26

Example Embodiment of an Email-Initiated Report Service

Figure 11:
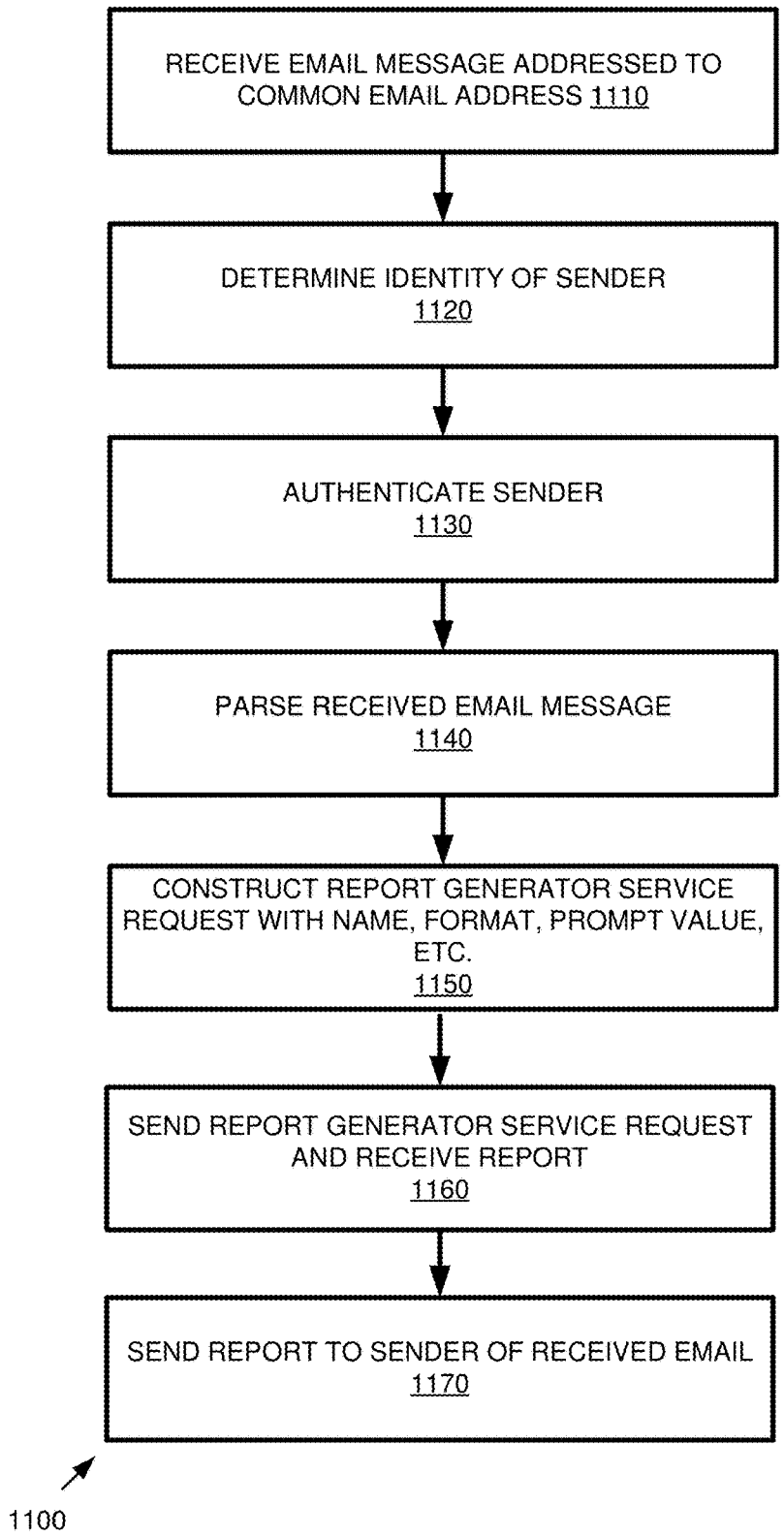
FIG. 11 is a flowchart of an example implementation of an email-initiated report service.

In any of the examples herein, various other techniques can be included. FIG. 11 shows an example method 1100 implementing further technologies that can be included.

At 1110, an enterprise resource planning server system can receive an email message addressed to a common email address. The email can contain a plurality of report request parameters (e.g., arranged in a name-value pairs). An automated mailbox monitor can detect that the email has been received and schedule the email for further processing (e.g., by an authenticating system to determine if the sender of the email is authorized to use the system).

At 1120, the identity of the sender of the email can be determined. The email address of the sender can be used to determine the sender's identity and to further determine if the sender is part of a group and what the position of the sender is within the group.

At 1130, the sender can be authenticated and permitted to use the system. If the sender is successfully authenticated, the received email can be processed by a parser to determine the report request parameters therein. The authenticator can authorize the automated mailbox monitor to send the received email to the parser. For example, a flag associated with the received email can be set, indicating that the email can be further processed. If the sender is not authorized, the email can be deleted and a reply email can be sent to the sender informing the sender that the sender is not authorized to use the system.

At 1140, the email message can be parsed to determine the report request parameters. A parser can search the email message and extract the parameters by searching for keywords (e.g. names of a name-value pair) and extracting values associated with the keywords.

At 1150, the report request parameters can be transformed into a report generator service request (e.g., report request). The report generator service request can request a report by name, specify the file format of the report, and specify specific information requested to be included in the report by a prompt value, among other request possibilities.

At 1160, the report generator service request can be sent to an external report generator service to request a custom report be generated. The report can be generated based on the constructed request. When the report is generated, it can be sent back to the orchestrator and further processed. For example, the report can be formatted in a specific file format.

At 1170, the formatted report can be sent to the sender of the received email as specified by the identity of the sender.

Example 27

Example Use Case Scenario

Any number of use cases can be integrated into any of the examples herein.

In an example implementation, a user is in a situation (e.g. off-site meeting) where there is no access to a system administrator of a business objects database. In order to have custom information (e.g. sales forecasts for a specific timeframe) available to make a necessary decision, the user can request a custom report containing the required information via email to an enterprise resource system. The user can write the email from the user's email client (e.g., a enterprise email client, a webmail client, mobile email client, etc.) without the user having to log into a different system or launch a different application. For example, the user can write an email from a mobile phone and send it to the common email address in order to request a custom report.

The common email address is a single email address for an organizational reason (e.g., a single email address for report requests, a single email address for conference planning, etc.). A plurality of users (e.g., employees) can use the same single email address.

The enterprise resource system (e.g., enterprise resource planning server system) processes incoming email messages. First, the enterprise resource server system determines the user/employee that sent (e.g., requestor) the email message. The enterprise resource server system can determine the user from the sender address of the email. Second, the enterprise resource server system determines a group that the user is part of, and the position of the user within that group. The custom report request can then be assigned a group identification and a position identifier (e.g., the seniority of the employee).

The enterprise resource server system next parses the received email to extract report request parameters from the body of the email message. The enterprise resource server system can also parse other parts of the email message (e.g. the subject line) to extract other custom report request parameters. The enterprise resource server system then determines if the sender of the email is authorized to receive the requested report type and report range. If the sender is authorized, the enterprise resource server system requests a report be generated from report data stored in a business objects database. The report can be generated in a separate report generator service associated with an external system, or the report can be generated in the enterprise resource server system. The enterprise resource server system then formats the report as requested by the user and sends the report to the email address associated with the user.

Example 28

Example Email Plug-In

Figure 12:
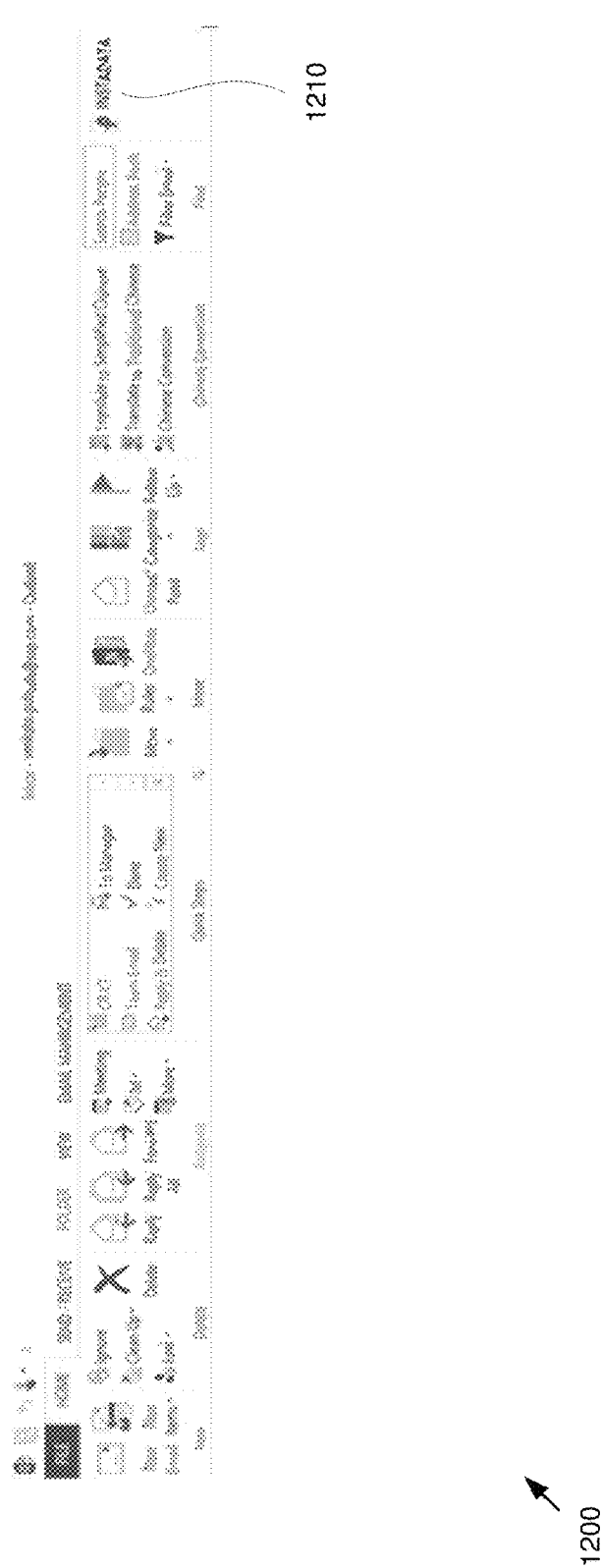
FIG. 12 is an example toolbar with a toolbar item to automatically generate a request email.
Figure 13:
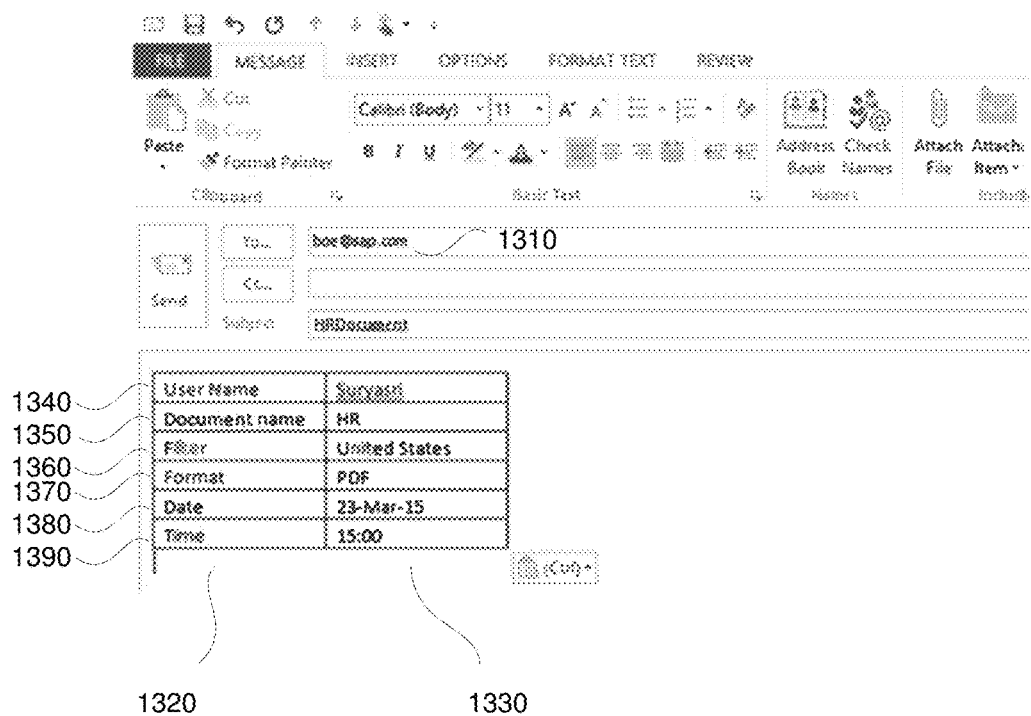
FIG. 13 is an example automatically generated registration email.

In any of the examples herein, a plug-in can be provided for email clients to further facilitate report requests. FIG. 12 illustrates an example email toolbar with a plug-in 1210 to automatically generate a request email. The plug-in can be used with any of the examples herein to automatically generate the request email, such as shown in FIG. 3, or a registration email, as shown in FIG. 13.

The plug-in 1210 can trigger an email client to create an email with a predetermined format and display it to the user when the plug-in icon is clicked. The email can contain keywords for report request parameters in a prearranged layout, where the keywords are associated with the sender of the email. The user need only fill in the values for the keywords and send the email.

Additionally, certain keywords, such as "report name" or "tag name," can be associated with prepopulated list boxes to aid the user in selecting a desired report. For example, the plug-in can communicate with the enterprise resource server system to receive a list of available report types for the user based on the user's email address. The plug-in can then insert the list of report types into the pre-generated request email, allowing the user to select from a known set of available report types.

Other keywords, such as "format" or "prompt value," can have prepopulated list boxes. For example, the contents of a list box for "prompt value" can dynamically change depending on the value selected for "report name." In this way the user is presented with options that will request a valid report. Furthermore, the plug-in can retrieve available format types from system information on the client device. For example, if the client device can display PDF documents, the plug-in can display "PDF" as an available format type.

The plug-in 1210 can also include a dropdown button, allowing the user to access previously sent emails with one click. Selecting one of the previous emails from the dropdown displays a pre-generated email with the same report request parameters as were previously sent. This allows the user to easily request update reports with the same report request parameters.

Example 29

Example Registration Email

FIG. 13 shows an example registration email 1300 that a user can send to the enterprise resource server system to request access to the email-initiated report service. The email can be generated the first time a user activates a plug-in to request reports, as shown in FIG. 12.

The email can be used to register a user with the email-initiated report system and also to provide default data to the plug-in. The registration email 1300 can be automatically addressed to the common email address 1310. It can have an email body comprising a table with name-value pairs. The name keywords 1320 can be populated automatically by the plug-in. The user can then enter data into the value column 1330. For example, the user can specify a user name 1340, a default document name 1350, a geographic location of the user 1360, a default report format 1370, and/or a date 1380 and time 1390 to generate reports.

The completed email can be sent to the common email address 1310, where the enterprise resource server can recognize it as a registration email. At the same time, the plug-in can save the completed data for use in subsequent emails (e.g., the plug-in can use the data to populate default values for future request emails).

Default parameters from the registration email can then be used as defaults when future report requests are received from the same email address. For example, a user can specify a particular report format is desired. In this way, the amount of information that the sender must provide can be reduced, leading to quicker requests and fewer overall errors.

Example 30

Example Computing Systems

Figure 14:
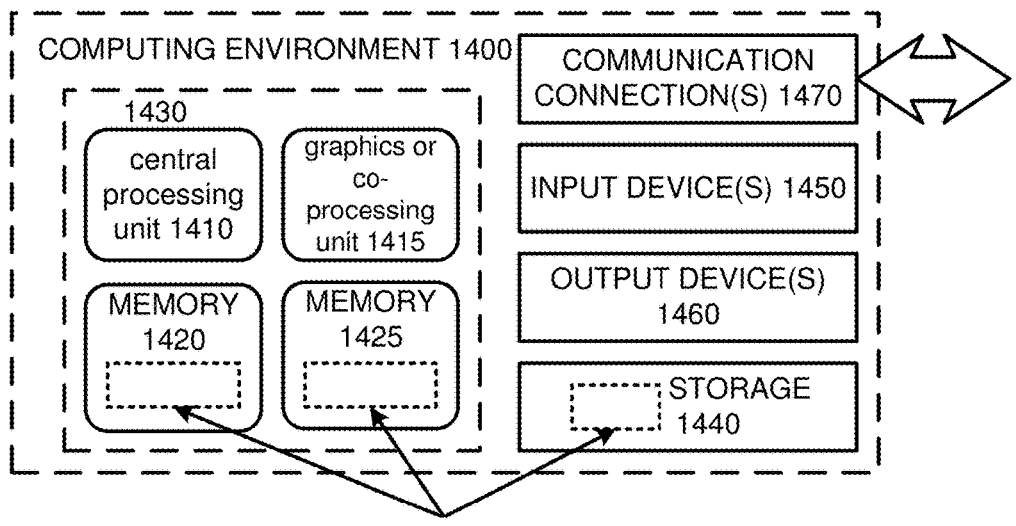
FIG. 14 is a diagram of an example computing system in which described embodiments can be implemented.

FIG. 14 illustrates a generalized example of a suitable computing system 1400 in which several of the described innovations may be implemented. The computing system 1400 is not intended to suggest any limitation as to scope of use or functionality, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s). The memory 1420, 1425 stores software 1480 implementing one or more innovations described herein, in the form of computer-executable instructions suitable for execution by the processing unit(s).

A computing system may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein. The storage 1440 does not include signals per se.

The input device(s) 1450 may be a touch input device such as a keyboard, mouse, pen, or trackball, a voice input device, a scanning device, or another device that provides input to the computing system 1400. For video encoding, the input device(s) 1450 may be a camera, video card, TV tuner card, or similar device that accepts video input in analog or digital form, or a CD-ROM or CD-RW that reads video samples into the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are highlevel abstractions for operations performed by a computer, and should not be confused with acts performed by a human being. The actual computer operations corresponding to these terms vary depending on implementation.

Example 31

Computer-Readable Media

Any of the computer-readable media herein can be non-transitory (e.g., volatile memory such as DRAM or SRAM, nonvolatile memory such as magnetic storage, optical storage, or the like) and/or tangible. None of the computer-readable media herein include signals per se. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 32

Example Advantages

The technologies described herein can provide automatic generation of custom reports without the need to understand how the reports are compiled. A user can request via email a specific report type, along with report parameters, and receive the report within a short time (e.g. within minutes or seconds, or nearly instantly).

Another advantage of the described technologies is that report generation speed can be increased by limiting the number of reports available to an authorized sender based on the identity of the sender. Furthermore, the reduced set of reports can decrease the bandwidth required to retrieve reports from a BI data repository.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. A method of generating a custom report implemented at least in part by a computing system comprising a computing device, the method comprising:

by the computing system:
receiving an email message, wherein the email message is addressed to a common email address;
determining, based on a sender address of the email message, an identity of a sender of the received email message;
extracting one or more report request parameters and one or more refresh parameters from the email message;
prefiltering a list of available reports based on the determined identity of the sender;
transforming the one or more report request parameters and the one or more refresh parameters into a report generator service request based on the determined identity of the sender and the prefiltered list of available reports, comprising one or more report generator service request parameters;
sending the report generator service request comprising the one or more report generator service request parameters to a report generator service;
responsive to the report generator service request, receiving the custom report for the determined sender from the report generator service;
sending the custom report to the sender of the received email message by email;
updating the custom report based on the one or more refresh parameters; and
sending the updated custom report to the sender of the received email message by email.

2. One or more computer-readable media comprising computer-executable instructions that when executed cause a computing system to perform the method of claim 1.

3. The method of claim 1, wherein the transforming comprises:
mapping name-value pairs from the one or more report request parameters to the report generator service request, wherein the report generator service request specifies report limitations based on the identity of the sender.

4. The method of claim 1, wherein:
the one or more report request parameters comprise a requested report name; and
the transforming comprises:
comparing a requested report name to the prefiltered list of available reports; and
setting a report type of the report generator service request to an available report type out of a plurality of available report types that matches the requested report name.

5. The method of claim 4 further comprising:
determining the plurality of available report types based on the identity of the sender.

6. The method of claim 1, wherein:
the one or more report request parameters comprise a prompt value, wherein the prompt value specifies a filtering range; and
the filtering range is included in the report generator service request as one of the one or more report generator service request parameters.

7. The method of claim 1, wherein:
the one or more report request parameters comprise a report format, wherein the report format specifies a format of the custom report; and
the report format is included in the report generator service request as one of the one or more report generator service request parameters.

8. The method of claim 1, wherein:
the one or more report request parameters comprise a report name; and
the transforming comprises transforming the report name to a recognized report type.

9. The method of claim 1, further comprising:
before receiving the email message, receiving a report registration email from the sender address, wherein the report registration email comprises a default parameter; and
when generating the custom report in response to the email message, using the default parameter.

10. The method of claim 1, wherein the identity of the sender comprises:
a group identifier, wherein the group identifier identifies a group of the sender; and
a position identifier, wherein the position identifier identifies the sender within the group.

11. The method of claim 10, further comprising:
authenticating the identity of the sender; and
based on the authenticated identity of the sender, restricting available report types based on the group identifier.

12. The method of claim 10, further comprising:
authenticating the identity of the sender; and
based on the authenticated identity of the sender, restricting available prompt values based on the position identifier.

13. A system configured to generate a report from an email, the system comprising:
one or more processor units;
computer-readable memory;
an email mailbox configured to receive and store email messages;
an automated mailbox monitor configured to monitor the email mailbox for a received email message;
an authenticator configured to determine an identity of a sender of the received email message;
a parser configured to extract one or more report request parameters from the received email message;
a report orchestrator configured to request a report based on the extracted one or more report request parameters and the identity of the sender, wherein the report orchestrator prefilters a list of available reports based on the identity of the sender and selects the report to request based on the prefiltered list of available reports; and
a report source document configured to create and format an instance of the report via the extracted one or more report request parameters, wherein the report source document is integrated with data display operations configured to format data for display within the instance of the report.

14. The system of claim 13, wherein the one or more report request parameters comprise one or more selected from the group consisting of:
a prompt value, wherein the prompt value specifies a filtering range;
a report format, wherein the report format specifies a format in which the report is generated; and
a report name, wherein the report name specifies at least a portion of a recognized report type.

15. The system of claim 13, wherein, based on the identity of the sender, the authenticator is further configured to determine a group identifier and a position identifier associated with a list of authorized users.

16. The system of claim 15, wherein the report orchestrator is further configured to limit a report type based on the group identifier and limit a prompt value based on the position identifier.

17. The system of claim 13, wherein the report orchestrator is further configured to request a raw data report from a report generator service.

18. The system of claim 13, wherein the report orchestrator is further configured to convert the report into a report format specified by a report request parameter and send the converted report to the sender of the received email message.

19. The system of claim 13, the report orchestrator is further configured to receive the one or more report request parameters and the identity of the sender to a report generator service and, receive, from the report generator service, data for generating the report to the report orchestrator.

20. One or more computer-readable storage media storing computer-executable instructions for causing a computing system to perform a method for generating a report, the method comprising:
receiving an email message at an email address, wherein the email address is monitored by an automated mailbox monitor that triggers generation of the report;
determining an identity of a sender of the received email message based on a sender address of the received email message;
authenticating the identity of the sender, wherein the authenticating comprises comparing the sender address of the received email message to a list of authorized users;
based on the identity of the sender, retrieving a group identifier and a position identifier;
prefiltering a list of available reports based on the group identifier;
extracting report request parameters from the received email message, wherein the extracting extracts report request parameters comprising a requested report name, a report format, and a prompt value;
determining a return report identifier based on the prefiltered list of available reports and the requested report name;
modifying the prompt value based on the position identifier;
constructing a report generator service request in the form of an application programming interface call comprising the return report identifier, the report format, the modified prompt value, the group identifier, and the position identifier;
sending the report generator service request to a report scheduler of a report generator service;
receiving a report source document from the report generator service, wherein the report source document comprises refresh commands configured to update the report and data display operations; and
sending an instance of the report to the sender address of the received email message based on the report source document.

* * * * *